(12) United States Patent
Hu et al.

(10) Patent No.: US 11,645,742 B2
(45) Date of Patent: *May 9, 2023

(54) ELECTRONIC DEVICE FOR OPTICALLY DETECTING APPEARANCE OF PRODUCT FOR DEFECTS

(71) Applicant: Fu Tai Hua Industry (Shenzhen) Co., Ltd., Shenzhen (CN)

(72) Inventors: Liu-Bin Hu, Shenzhen (CN); Bin Zou, Shenzhen (CN); Zhi-Cheng Huang, Shenzhen (CN)

(73) Assignee: Fu Tai Hua Industry (Shenzhen) Co., Ltd., Shenzhen (CN)

( * ) Notice: Subject to any disclaimer, the term of this patent is extended or adjusted under 35 U.S.C. 154(b) by 47 days.

This patent is subject to a terminal disclaimer.

(21) Appl. No.: 17/007,428

(22) Filed: Aug. 31, 2020

(65) Prior Publication Data

US 2021/0110528 A1    Apr. 15, 2021

(30) Foreign Application Priority Data

Oct. 14, 2019   (CN) .......................... 201910973090.5

(51) Int. Cl.
*G06T 7/00* (2017.01)
*G06T 7/70* (2017.01)
(Continued)

(52) U.S. Cl.
CPC ......... *G06T 7/0004* (2013.01); *G01N 21/255* (2013.01); *G01N 21/29* (2013.01); *G06T 7/70* (2017.01); *G06T 2207/10004* (2013.01)

(58) Field of Classification Search
CPC .......... G06T 7/0004; G06T 7/70; G06T 7/80; G06T 2207/10004; G01N 21/255;
(Continued)

(56) References Cited

U.S. PATENT DOCUMENTS

2021/0109031 A1*   4/2021   Hu ........................ G06T 7/0004

FOREIGN PATENT DOCUMENTS

| CN | 108663369 | 10/2018 |
| CN | 109406533 | 3/2019 |
| CN | 110108711 | 8/2019 |

OTHER PUBLICATIONS

Feng Ping etc., Image acquisition and Processing system, Digital Image Processing Technology of PCB By Automatic Optical Detection, Oct. 2018, pp. 31-36, Southwest Jiaotong University Press.

* cited by examiner

*Primary Examiner* — Emily C Terrell
*Assistant Examiner* — Ahmed A Nasher
(74) *Attorney, Agent, or Firm* — ScienBiziP, P.C.

(57) ABSTRACT

An electronic device for optically detecting an appearance of a product for defects includes a first camera device, a second camera device, at least one white light source, and at least one red light source. The first camera device is perpendicular to a plane of the product to be detected. When the red light source is activated, the first camera device captures images of edges of the plane of the product, when the white light source is activated, the second camera device captures images of the plane of the product. The electronic device detects the appearance of the plane of the product for defects according to the images captured by the first and second camera devices, the defects can include stair slope errors, scratches, sanding marks, and gas marks.

11 Claims, 11 Drawing Sheets

(51) Int. Cl.
*G01N 21/29* (2006.01)
*G01N 21/25* (2006.01)

(58) Field of Classification Search
CPC .... G01N 21/31; G01N 21/29; G01N 21/8806; G01N 2021/8845; G01N 21/88; G01N 21/01
See application file for complete search history.

ELECTRONIC DEVICE FOR OPTICALLY DETECTING APPEARANCE OF PRODUCT FOR DEFECTS

CROSS-REFERENCE TO RELATED APPLICATIONS

This application claims priority to Chinese Patent Application No. 201910973090.5 filed on Oct. 14, 2019, the contents of which are incorporated by reference herein.

FIELD

The subject matter herein generally relates to manufacturing, and particularly to an electronic device for optically detecting an appearance of a product for defects.

BACKGROUND

In the industrial production process, errors and improper operations can easily cause damage to mar an appearance of products, and defects such as stair slope errors, scratches, sanding marks, and gas marks on surfaces of the products can occur. Thus, appearance detection is necessary.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage devices. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
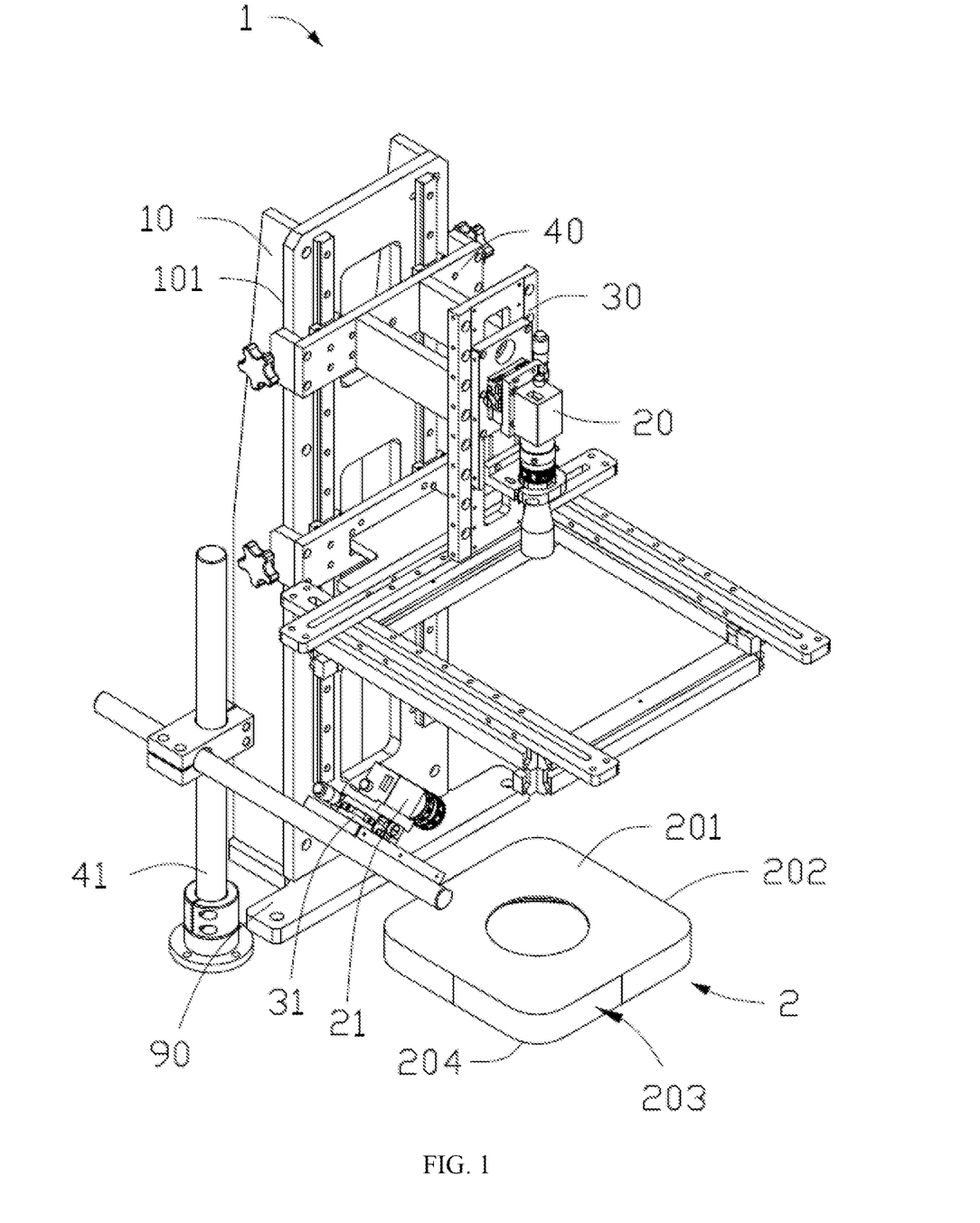
FIG. 1 is a schematic view of a first embodiment of an electronic device.

FIG. 1 illustrates an electronic device 1 in a first embodiment. The electronic device 1 detects an appearance of a plane and edges of a product 2 for defects, by capturing and analyzing images of the plane and the edges of the product 2. The defects including stair slope errors, scratches, sanding marks, and gas marks may thus be revealed. In at least one embodiment, the product 2 can be a casing of a device such as a router, a modem, or a TV box.

The gas mark on the plane of the product 2 may be a light gray rectangle, and a direction of the gas mark is toward an opening of the product 2. The stair slope error on the plane of the product 2 is crescent-shaped, generally located at an edge, and is often highlighted in color. The scratch on the plane of the product 2 is white and generally in a form of strips and filaments.

In at least one embodiment, a gas mark has a minimum length of 5 mm and a maximum length of 90 mm, and a minimum width of 2 mm and a maximum width of 50 mm. A stair slope error has a minimum chord length of 1 mm and a maximum chord length of 70 mm. A scratch has a minimum width of 0.1 mm and a maximum width of 10 mm. These defects with above-mentioned sizes may be detected by analyzing the images of the plane and edges of the product 2.

Figure 2:
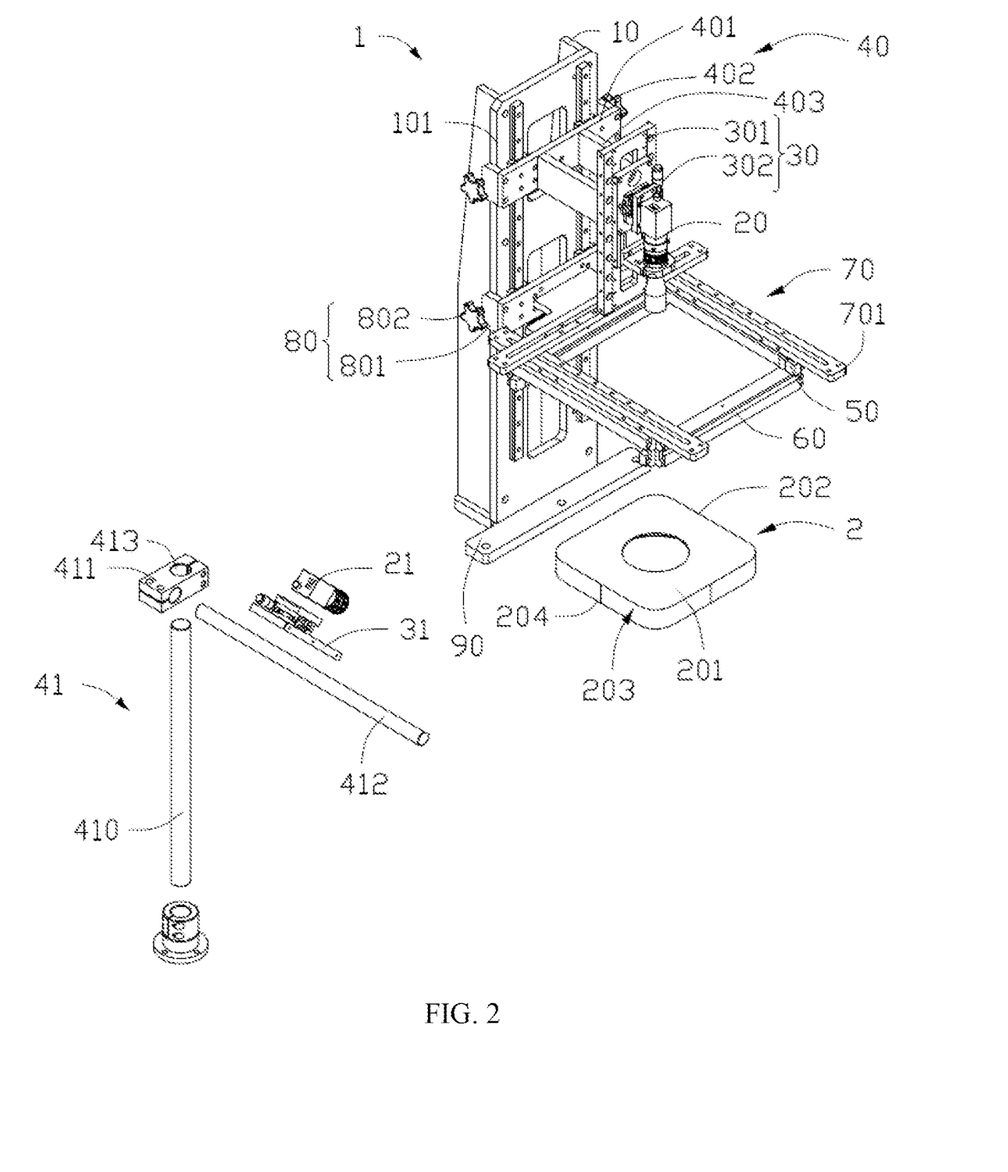
FIG. 2 is an exploded view of the first embodiment of the electronic device in FIG. 1.

Referring to FIGS. 1 and 2, in a first embodiment, the electronic device 1 includes, but is not limited to, a bracket 10, a first camera device 20, a second camera device 21, a first camera bracket 30, a second camera bracket 31, a first camera adjustment bracket 40, a second camera adjustment bracket 41, at least one white light source 50, at least one red light source 60, a light source bracket 70, a light source adjustment bracket 80, and a base 90. The first camera bracket 30, the second camera bracket 31, and the light source bracket 70 are arranged on the bracket 10. The first camera device 20 is arranged on the first camera bracket 30, the second camera device 21 is arranged on the second camera bracket 31. The at least one white light source 50 and the at least one red light source 60 are arranged on the light source bracket 70. The base 90 is fixed to an end of the bracket 10.

In the first embodiment, the first camera device 20 can be an industrial camera with 12 million pixels, with a fixed-focus industrial lens with a minimum focal length of 7 mm and a maximum focal length of 10 mm. The second camera device 21 can be an industrial camera with 8 million pixels, with a fixed-focus industrial lens with a minimum focal length of 6 mm and a maximum focal length of 9 mm. The focal length of the first camera device 20 and the second camera device 21 can be calculated by an equation f=lens magnification*WD. WD is a working distance of the first and second camera devices. The first camera device 20 and the second camera device 21 have a minimum exposure time of 4700 μs and a maximum exposure time of 5000 μs.

The electronic device 1 further includes two white light sources 50 and a red light source 60. The white light sources 50 and the red light source 60 are bar-shaped light sources, and extension directions of them are in parallel with the plane of the product 2. In at least one embodiment, the white light sources 50 and the red light source 60 have a minimum brightness of 7100 lm and a maximum brightness of 8100 lm.

In the first embodiment, the product 2 includes a plane 201, four edges 202 on the plane 201, three side surfaces 203, and a 3D surface 204. When the product 2 is placed on the electronic device 1, the plane 201 faces the first camera device 20 and the second camera device 21. When the red light source 60 is activated, the first camera device 20 captures images of the edges 202 of the plane 201. When the white light source 50 is activated, the second camera device 21 captures images of the plane 201. The appearance of the plane 201 is detected for defects according to the images captured by the first camera device 20 and the second camera device 21.

Figure 3:
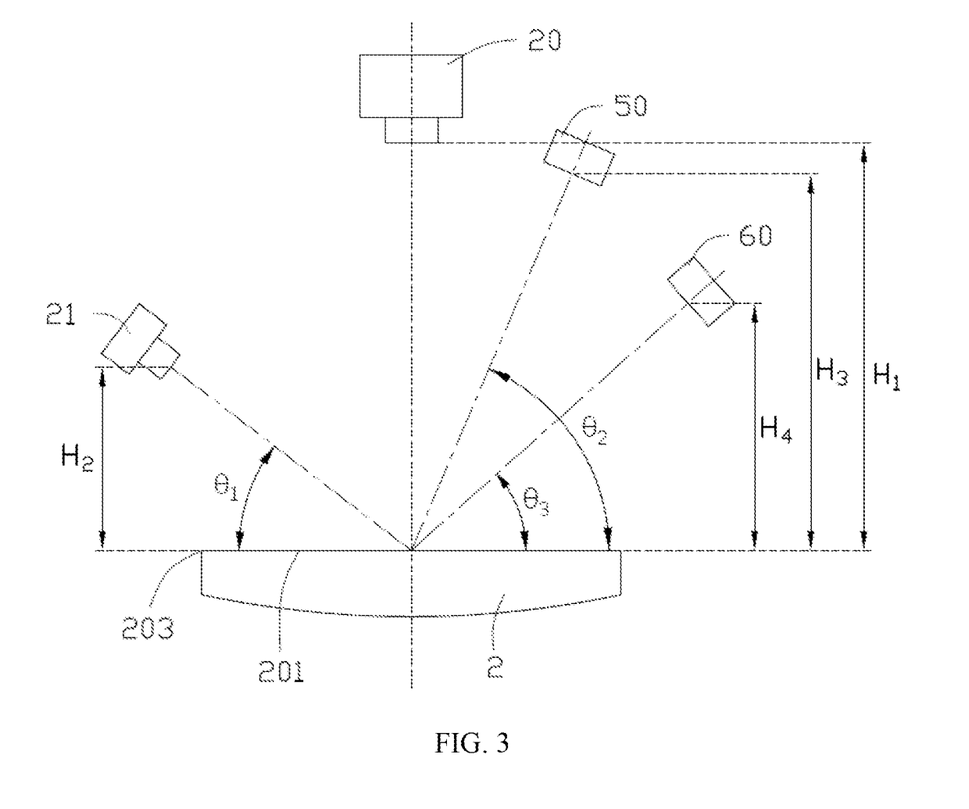
FIG. 3 is a schematic view of a first embodiment of the component layout of the electronic device of FIG. 1.

Referring to FIG. 3, in the first embodiment, the first camera device 20 is perpendicular to the plane 201, a distance between the first camera device 20 and the plane 201 is a first preset distance H1. A distance between the second camera device 21 and the plane 201 is a second preset distance H2. An angle between the second camera device 21 and the plane 201 is a first preset angle θ1. A distance between the white light source 50 and the plane 201 is a third preset distance H3. An angle between the white light source 50 and the plane 201 is a second preset angle θ2. A distance between the red light source 60 and the plane 201 is a fourth preset distance H4. An angle between the red light source 60 and the plane 201 is a third preset angle θ3.

In the first embodiment, the first preset distance H1=d*[(a+b)/2], the second preset distance H2=e*[(a+b)/2], the third preset distance H3=f*[(a+b)/2], and the fourth preset distance H4=g*[(a+b)/2]. Therein a is a length value of the product 2, b is a width value of the product 2, and c is a height value of the product 2, d, e, g, θ1, θ2, and θ3 meet following requirements: $1.7<d<2$, $0.8<e<1.1$, $1.6<f<1.9$, $0.7<g<0.9$, $10°<θ1<50°$, $30°<θ2<80°$, $20°<θ3<70°$.

As illustrated in FIGS. 1 and 2, in the first embodiment, the second camera adjustment bracket 41 includes a fixing rod 410, a third sliding portion 411, and a rotating rod 412. The third sliding portion 411 defines two through holes 413 which are perpendicular to each other. The third sliding portion 411 is slidably sleeved on the fixing rod 410 through a through hole 413. The rotating rod 412 is rotatably arranged on the third sliding portion 411 through another through hole 413. The second camera bracket 31 is arranged on the rotating rod 412. When the third sliding portion 411 is driven to slide up and down along the fixing rod 410, the rotating rod 412 can also be driven to move up and down to adjust a position of the second camera device 21, and render the distance between the second camera device 21 and the plane 201 to be the second preset distance H2. When the rotating rod 412 is rotated, the second camera bracket 31 can thus be driven to rotate, thereby the second camera device 21 is also driven to rotate, and renders the angle between the second camera device 21 and the plane 201 to be the first preset angle θ1.

The bracket 10 includes two slide rails 101. The camera adjustment bracket 40 includes a first sliding portion 401, a first locking portion 402, and a connection portion 403. Two ends of the first sliding portion 401 are respectively sleeved on the slide rail 101, and one end is engaged with the first locking portion 402. The first locking portion 402 locks the first sliding portion 401. The connection portion 403 is fixed to the first sliding portion 401 and the first camera bracket 30. The first camera bracket 30 includes a fixing portion 301 and a fine adjustment portion 302. The fixing portion 301 fixes the camera device 20, and the fine adjustment portion 302 adjusts the position of the first camera device 20 with fine precision. When the first locking portion 402 is rotated, the first sliding portion 401 is driven by the first locking portion 402 to slide up and down along the slide rail 101, the position of the first camera device 20 is thus adjusted. The fine adjustment portion 302 is further driven to adjust the position of the first camera device 20 and renders the distance between the first camera device 20 and the plane 201 to be the first preset distance H1.

In the first embodiment, the light source adjustment bracket 80 includes a second sliding portion 801 and a second locking portion 802. Two ends of the second sliding portion 801 are respectively sleeved on the slide rail 101, and one end is engaged with the second locking portion 802. The light source bracket 70 includes two supporting portions 701 respectively arranged on the second sliding portion 801. The white light sources 50 are respectively arranged on the supporting portions 701. The red light source 60 is arranged on the two supporting portions 701. When the second locking portion 802 is rotated, the second sliding portion 801 is driven by the second locking portion 802 to slide up and down along the slide rail 101, positions of the white light sources 50 are thus adjusted, which renders the distance between the white light source 50 and the plane 201 to be the third preset distance H3, and renders the angle between the white light source 50 and the plane 201 to be the second preset angle θ2. At the same time, a position of the red light source 60 is also adjusted, which renders the distance between the red light source 60 and the plane 201 to be the fourth preset distance H4, and renders the angle between the red light source 60 and the plane 201 to be the third preset angle θ3.

In the first embodiment, when the white light sources 50 are activated, the second camera device 21 captures an image of the plane 201, the defects including the gas marks and the sand marks on the plane 201 are revealed according to the image captured by the second camera device 21. When the red light source 60 is activated, the first camera device 20 respectively captures an image of each edge 202, the defects including the stair slope errors and the scratches on the plane 201 are revealed according to four images captured by the first camera device 20.

Figure 4:
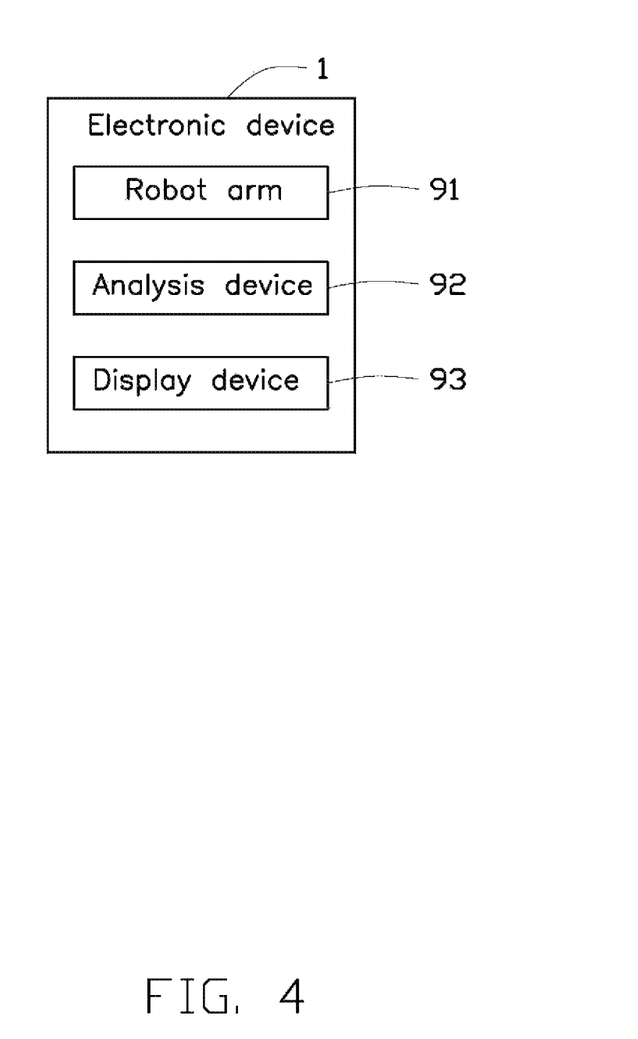
FIG. 4 is a block view of the first embodiment of the electronic device of FIG. 1.

Referring to FIG. 4, the electronic device 1 further includes a robot arm 91. The robot arm 91 sequentially rotates the product 2 through 90 degrees in a horizontal direction, so that each edge 202 enters a capturing range of the first camera device 20, and the plane 201 is in a capturing range of the second camera device 21. The first camera device 20 captures four images of the edges 202, and the second camera device 21 captures an image of the plane 201.

Figure 5:
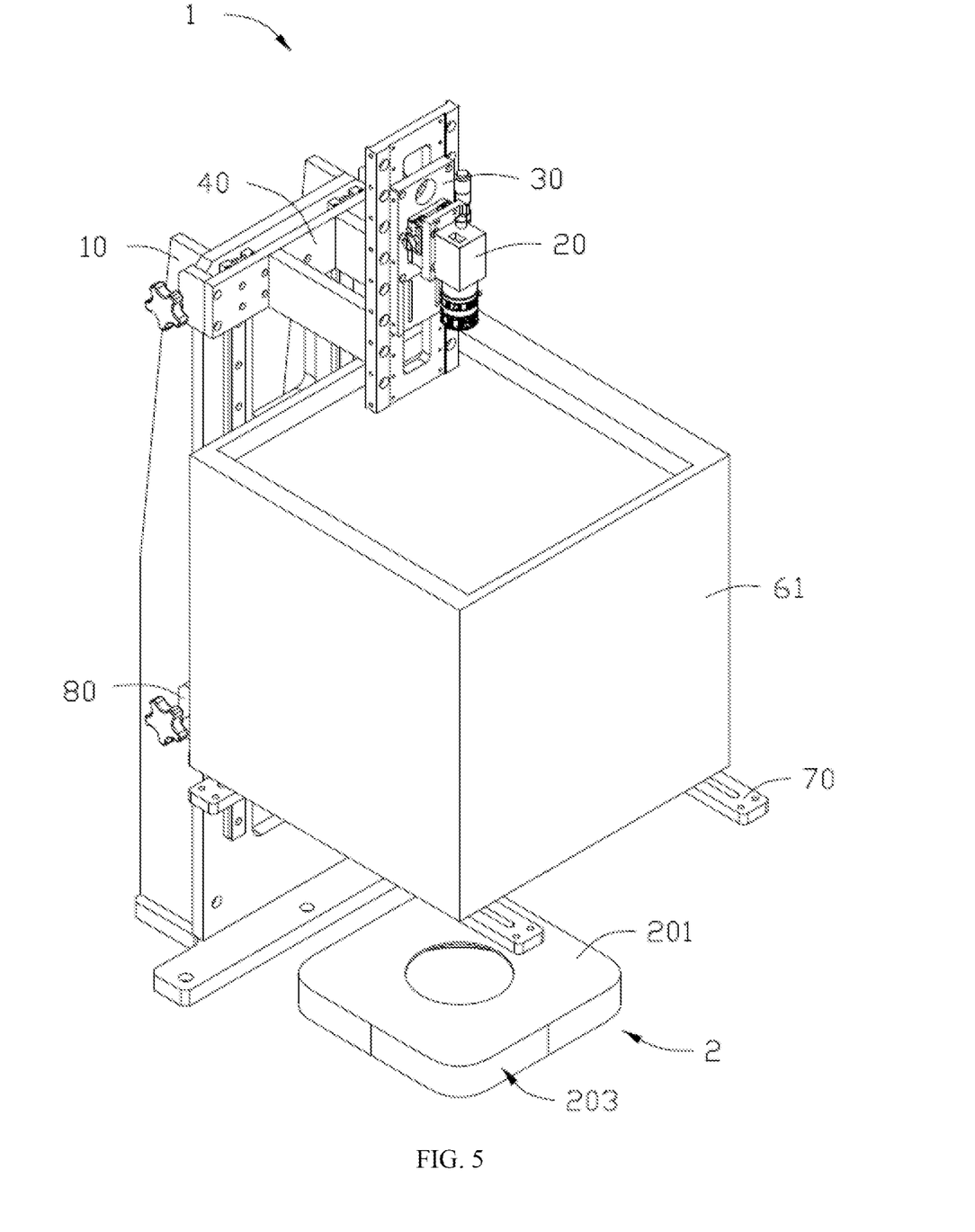
FIG. 5 is a schematic view of a second embodiment of an electronic device.

Referring to FIG. 5, in a second embodiment, the electronic device 1 further includes a coaxial light source 61. The coaxial light source 61 is arranged on the light source bracket 70. When the coaxial light source 61 is activated, the first camera device 20 captures images of the plane 201 and the side surface 203 of the product 2 for detecting appearances of the plane 201 and the side surface 203 for defects.

In the second embodiment, the first camera device 20 can be an industrial camera with 12 million pixels, equipped with a fixed-focus industrial lens with a minimum focal length of 23 mm and a maximum focal length of 27 mm, and a depth of 6 mm. The coaxial light source 61 has a minimum color temperature of 5000 K and a maximum color temperature of 6000 K.

Figure 6:
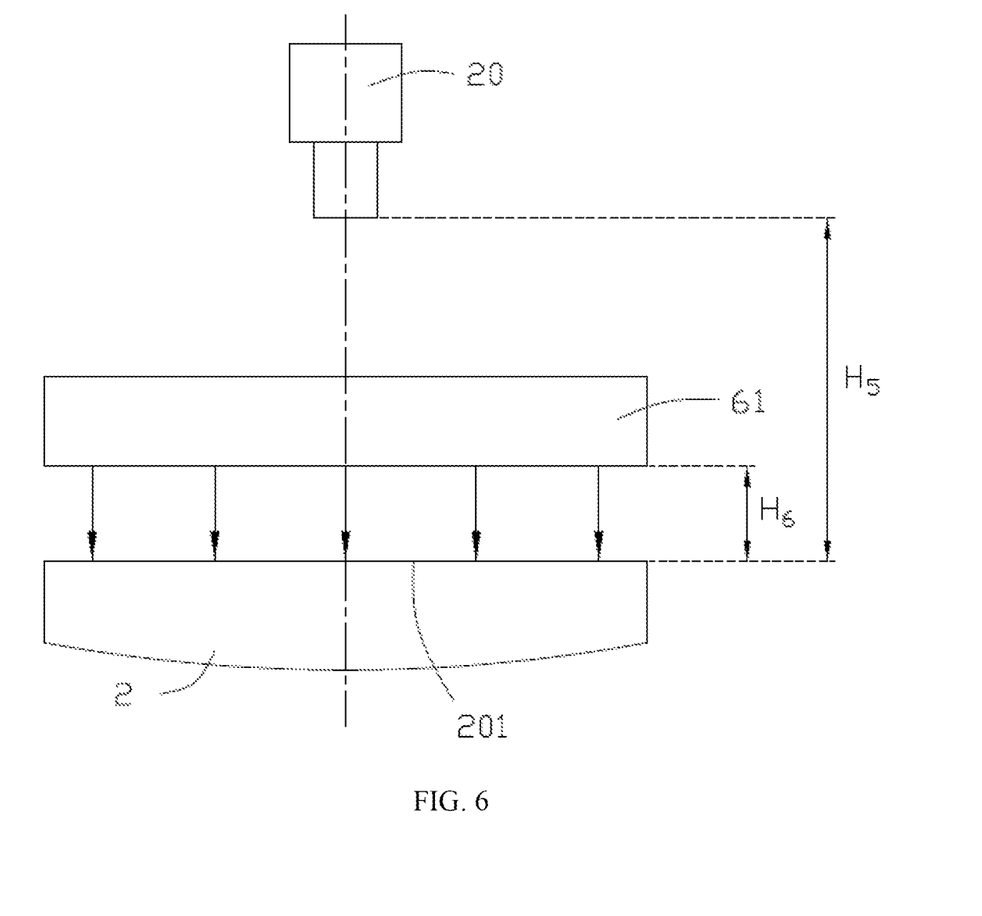
FIG. 6 is a schematic view of the second embodiment of the component layout of the electronic device.

Referring to FIG. 6, when the appearances of the plane 201 and the side surface 203 of the product 2 are detected for defects, the first camera device 20 and the coaxial light source 61 are perpendicular to the plane 201 of the product 2, a distance between the first camera device 20 and the plane 201 is a fifth preset distance H5, and a distance between the coaxial light source 61 and the plane 201 is a sixth preset distance H6.

In the second embodiment, the fifth preset distance H5=m*[(a+b)/2], and the sixth preset distance H6=n*[(a+b)/2], therein m and n meet following requirements: 2.1<m<2.5, 0.3<n<0.4.

Figure 7:
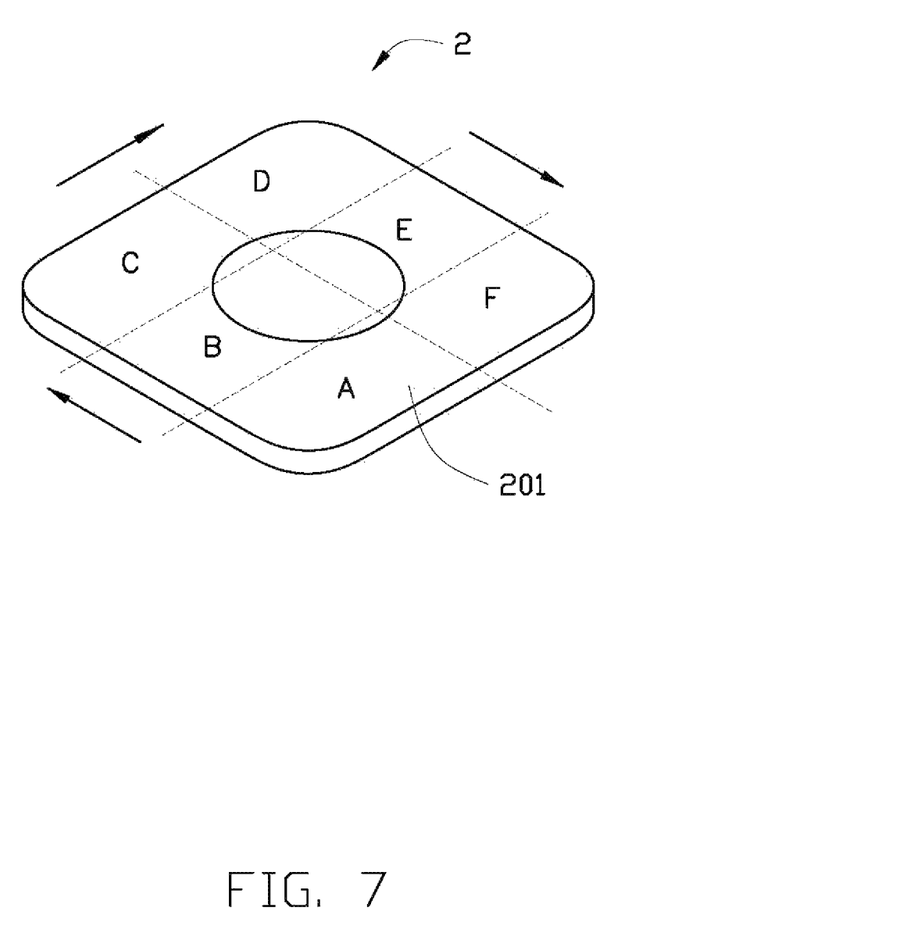
FIG. 7 is a schematic view of the second embodiment of detectable areas of a plane of a product to be detected by the electronic device of FIG. 6.
Figure 8:
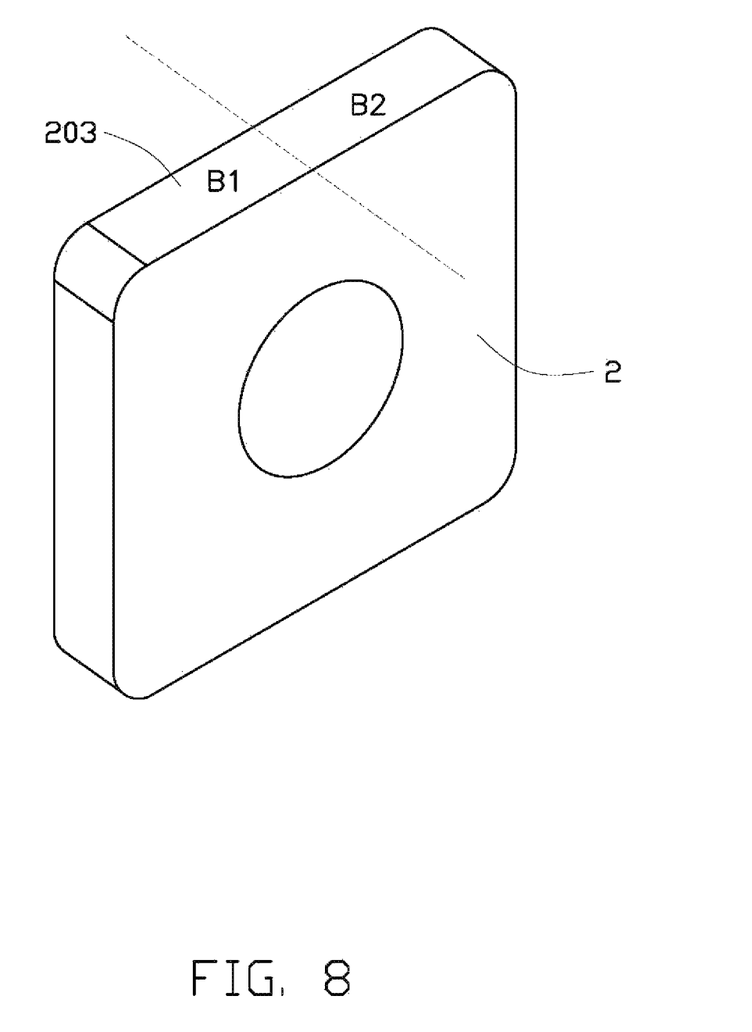
FIG. 8 is a schematic view of the second embodiment of detectable areas of a side surface of the product to be detected by the electronic device of FIG. 6.

Referring to FIGS. 7 and 8, in the second embodiment, the plane 201 includes six detectable areas, each side surface 203 includes two detectable areas. When the coaxial light source 61 is activated, the first camera device 20 captures an image of each detectable area of the plane 201 and the side surfaces 203.

When the first camera device 20 captures the images of the plane 201, the robot arm 91 controls the product 2 to perform a matrix movement, all detectable areas enter the capturing range of the first camera device 20 in order. When the first camera device 20 captures the images of the side surfaces 203, the robot arm 91 controls the product 2 to move left and right in the vertical direction, thus the detectable areas on the side surfaces 203 are switched into the capturing range of the first camera device 20.

In an initial state, a detectable area A of the plane 201 is within the capturing range of the first camera device 20, the coaxial light source 61 is activated, and the first camera device 20 captures an image of the detectable area A. Then, the robot arm 91 controls the product 2 to perform a matrix movement, so that detectable areas B-F move in order into the capturing range of the first camera device 20. The first camera device 20 captures a total of six images of the plane 201.

The robot arm 91 further rotates the product 2 through 90 degrees, so that the detectable area B1 of one of the side surface 203 is within the capturing range of the first camera device 20, and the image of the detectable area B1 is captured by the first camera device 20. Then the robot arm 91 moves the product 2 until the detectable area B2 enters the capturing range of the first camera device 20, and the image of the detectable area B2 is captured by the first camera device 20. Then, the robot arm 91 rotates the product 2 through 90 degrees again and repeats the above actions, so as to capture images of the two detectable areas B1 and B2 of the other side surface 203. The first camera device 20 captures a total of six images of the three side surfaces 203 in this way. At this time, defects including acid drips, dirt, corrosion points, uneven dyeing, white spots, material discoloration, and watermarks on the plane 201 and the side surfaces 203 are exposed to be detected by the first camera device 20.

Figure 9:
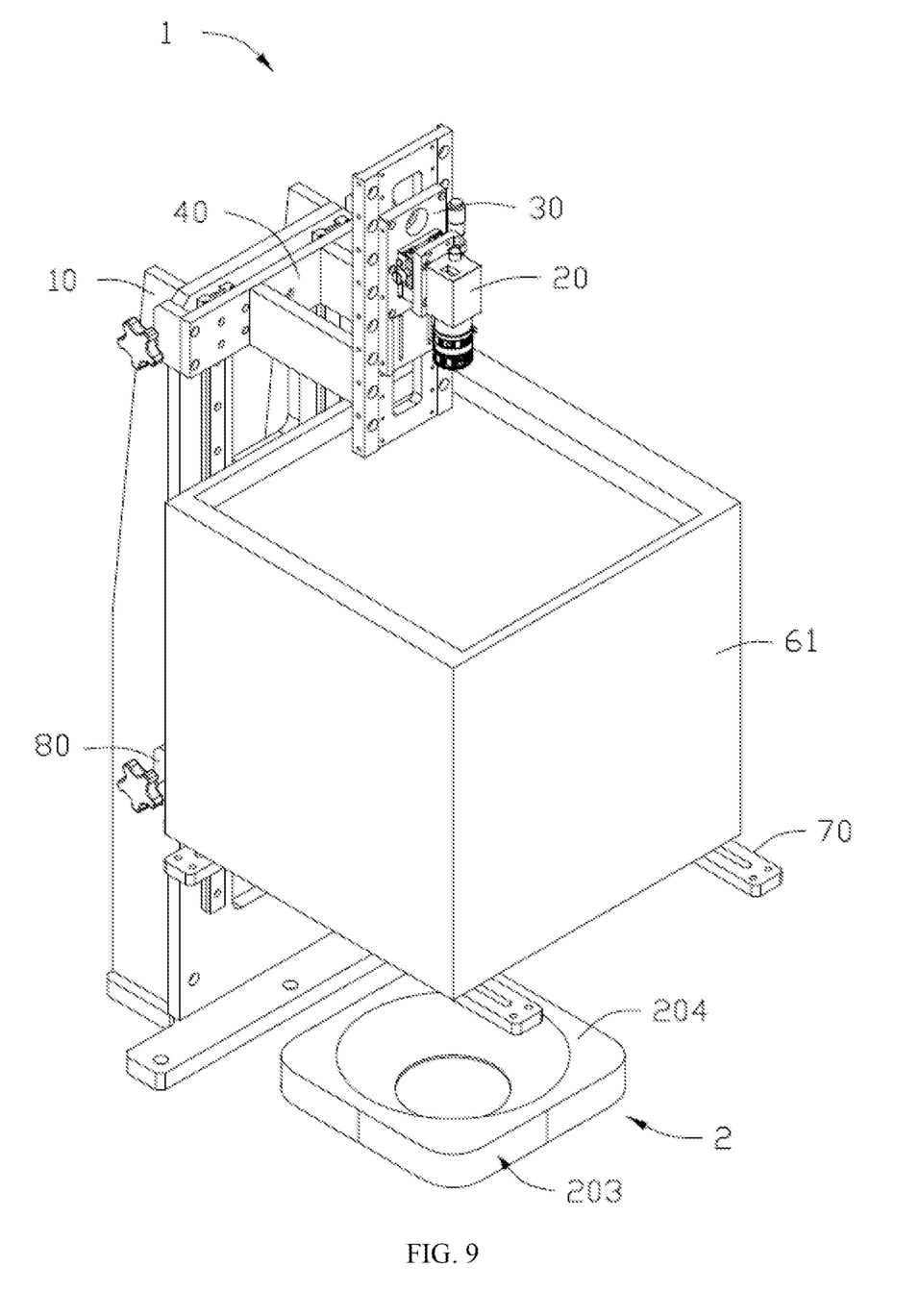
FIG. 9 is a schematic view of a third embodiment of an electronic device.

Referring to FIG. 9, in a third embodiment, the first camera device 20 can be an industrial camera with 12 million pixels, equipped with a fixed-focus industrial lens with a minimum focal length of 33 and a maximum focal length of 37 mm, and a depth of 4 mm. The coaxial light source 61 has a minimum color temperature of 5000 K and a maximum color temperature of 6000 K.

Figure 10:
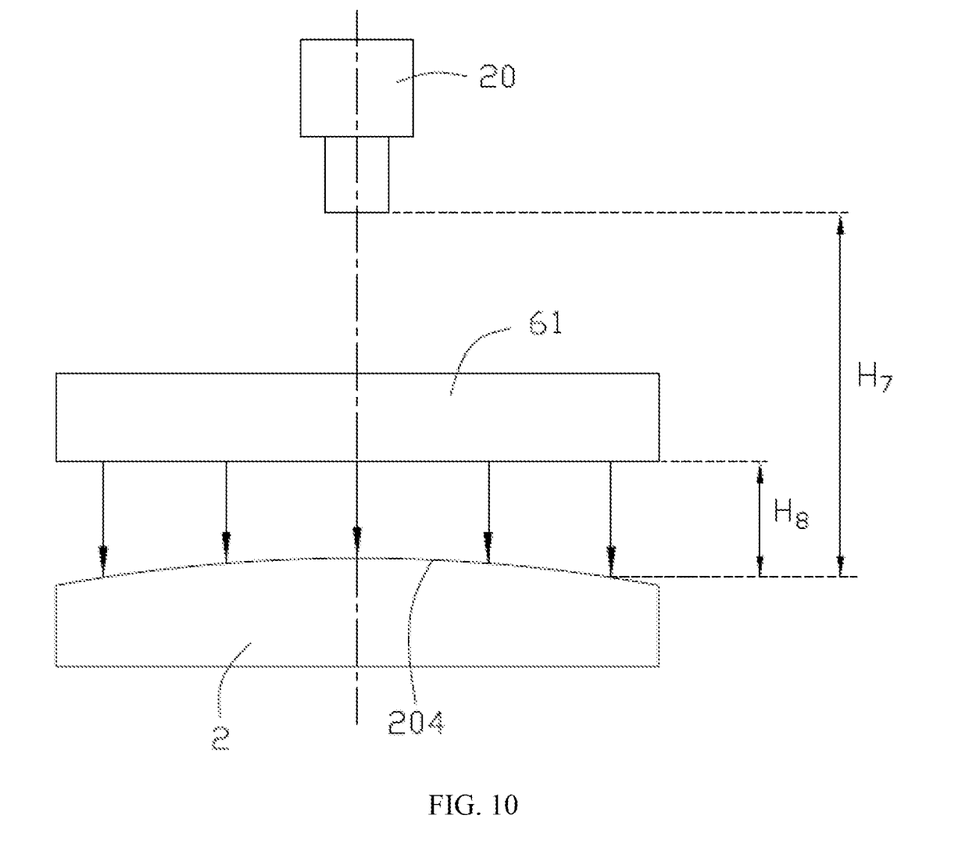
FIG. 10 is a schematic view of the third embodiment of the component layout of the electronic device of FIG. 9.

Referring to FIG. 10, when the 3D surface 204 of the product 2 is detected for defects, the first camera device 20 and the coaxial light source 61 are perpendicular to a normal tangent plane of the 3D surface 204 of the product 2, the distance between the first camera device 20 and the 3D surface 204 is a seventh preset distance H7, and the distance between the coaxial light source 61 and the 3D surface 204 is an eighth preset distance H8.

In the third embodiment, the seventh preset distance H7=i*[(a+b)/2], and the eighth preset distance H8=j*[(a+b)/2], therein i and j meet following requirements: 1.8<i<2.2, 0.1<j<0.2.

Figure 11:
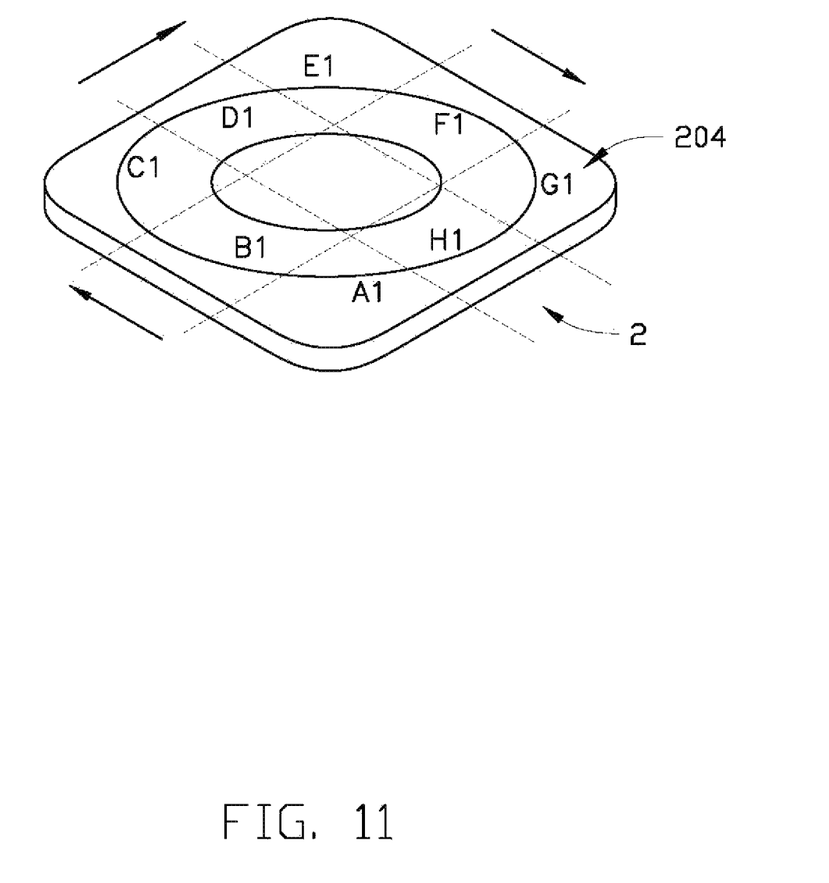
FIG. 11 is a schematic view of the third embodiment of detectable areas of a 3D surface of the product to be detected by the electronic device of FIG. 9.

Referring to FIG. 11, in the third embodiment, the 3D surface 204 includes eight detectable areas. When the coaxial light source 61 is activated, the first camera device 20 captures an image of each detectable area of the 3D surface 204.

When the first camera device 20 captures an image of a detectable area of the 3D surface 204, the robot arm 91 controls the product 2 to perform a matrix movement, all detectable areas enter the capturing range of the first camera device 20 in order.

In an initial state, a detectable area A1 of the 3D surface 204 is within the capturing range of the first camera device 20, the coaxial light source 61 is activated, and the first camera device 20 captures an image of the detectable area A1. Then, the robot arm 91 controls the product 2 to perform a matrix movement clockwise, so that detectable areas B1-H1 are driven to enter the capturing range of the first camera device 20 in order. The first camera device 20 captures a total of eight images of the 3D surface 204.

When the robot arm 91 controls the product 2 to move, since the 3D surface 204 has a certain arc, the normal tangent of the arc surface must be kept perpendicular to the first camera device 20 when each detectable area is detected.

As illustrated in FIG. 4, the electronic device 1 further includes an analysis device 92 and a display device 93. In at least one embodiment, the analysis device 92 is a processor, and the display device 93 is a display screen.

The analysis device 92 analyzes the images captured by the first camera device 20 by an appearance defect neural network algorithm, so as to determine upon the existence of defects including the stair slope errors and the scratches on the edges 202. The analysis device 92 analyzes the images captured by the second camera device 21 by the appearance defect neural network algorithm, so as to determine upon the existence of defects including the sanding marks and the gas marks on the plane 201. The display device 93 displays a result of the analysis made by the analysis device 92.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device for optically detecting an appearance of a product for defects comprising:
   a first camera device perpendicular to a plane of the product to be detected, wherein a distance between the first camera device and the plane is a first preset distance H1;
   a second camera device, wherein a distance between the second camera device and the plane is a second preset distance H2, and an angle between the second camera device and the plane is a first preset angle θ1;
   at least one white light source, wherein a distance between the white light source and the plane is H3, and an angle between the white light source and the plane is a second preset angle θ2; and
   at least one red light source, wherein a distance between the red light source and the plane is a fourth preset distance H4, and an angle between the red light source and the plane is a third preset angle θ3,
   wherein when the red light source is activated, the first camera device captures images of edges of the plane of the product, the electronic device detects the appearance of the plane of the product for the defects comprising stair slope errors and scratches according to the images captured by the first camera device, when the white light source is activated, the second camera device captures images of the plane of the product, the electronic device detects the appearance of the plane of the product for the defects comprising sanding marks and gas marks according to the images captured by the second camera device, the gas mark on the plane of the product is light gray and rectangular, and a direction of the gas mark is toward an opening of the product,
   wherein the first preset distance H1=d*[(a+b)/2], the second preset distance H2=e*[(a+b)/2], the third preset distance H3=f*[(a+b)/2], the fourth preset distance H4=g*[(a+b)/2], a is a length value of the product, b is a width value of the product, units of measure of H1, H2, H3, H4, a, and b are millimeters, d, e, f, g, θ1, θ2, and θ3 meet following requirements: d is greater than 1.7 and less than 2, e is greater than 0.8 and less than 1.1, f is greater than 1.6 and less than 1.9, g is greater than 0.7 and less than 0.9, 10°<θ1<50°, 30°<θ2<80°, 20°<θ3<70°.

2. The electronic device according to claim 1, further comprising:
   a bracket;
   a first camera bracket;
   a second camera bracket; and
   a light source bracket; wherein the first camera bracket, the second camera bracket, and the light source bracket are arranged on the bracket, the first camera device is arranged on the first camera bracket, the second camera device is arranged on the second camera bracket, the white light source and the red light source are arranged on the light source bracket.

3. The electronic device according to claim 2, further comprising:
   a first camera adjustment bracket arranged on the bracket and connected to the first camera bracket, wherein the first camera adjustment bracket adjusts a position of the first camera device and renders the distance between the first camera and the plane to be the first preset distance H1; and
   a second camera adjustment bracket connected to the second camera bracket, wherein the second camera adjustment bracket adjusts a position of the second camera device, renders the distance between the second camera device and the plane to be the second preset distance H2, and renders the angle between the second camera device and the plane to be the first preset angle θ1.

4. The electronic device according to claim 3, wherein the first camera bracket comprises a fixing portion and a fine adjustment portion, the fixing portion fixes the first camera device, and the fine adjustment portion precisely adjusts the position of the first camera device and renders the distance between the first camera device and the plane to be the first preset distance H1.

5. The electronic device according to claim 3, wherein
   the bracket comprises two slide rails;
   the first camera adjustment bracket comprises a first sliding portion, a first locking portion, and a connection portion;
   each of ends of the first sliding portion are sleeved on each of the two slide rails;
   one end is engaged with the first locking portion, the first locking portion locks the first sliding portion;
   the connection portion is connected to the first sliding portion and the first camera bracket;
   when the first locking portion is rotated, the first sliding portion is driven by the first locking portion to slide up and down along the slide rails to adjust the position of the first camera device.

6. The electronic device according to claim 5, further comprising a light source adjustment bracket arranged on the bracket and connected to the light source bracket, wherein
   the light source adjustment bracket adjusts a position of the white light source, renders the distance between the white light source and the plane to be the third preset distance H3, and renders the angle between the white light source and the plane to be the second preset angle θ2;
   the light source adjustment bracket further adjusts a position of the red light source, renders the distance between the red light source and the plane to be the fourth preset distance H4, and renders the angle between the red light source and the plane to be the third preset angle θ3.

7. The electronic device according to claim 6, wherein
   the light source adjustment bracket comprises a second sliding portion and a second locking portion, each of ends of the second sliding portion are sleeved on each of the two slide rails, and one end is engaged with the second locking portion;
   the light source bracket comprises two supporting portions arranged on the second sliding portion, the white light source is arranged on the supporting portion, the red light source is arranged on the two supporting portions, when the second locking portion is rotated, the second sliding portion is driven by the second locking portion to slide up and down along the slide rails to adjust positions of the white light source and the red light source.

8. The electronic device according to claim 1, further comprising:

a robot arm controlling each of the edges of plane of the product to enter a capturing range of the first camera device by rotating the product.

9. The electronic device according to claim 1, further comprising:
an analysis device determining whether the defects comprising the stair slope errors or the scratches exist on the edges of the plane of the product by analyzing the images captured by the first camera device according to an appearance defect neural network algorithm, and determining whether the defects comprising the gas marks or the sanding marks exist on the plane of the product by analyzing the images captured by the second camera device according to the appearance defect neural network algorithm; and
a display device displaying a result of analysis made by the analysis device.

10. The electronic device according to claim 1, wherein the first camera device has a minimum focal length of 7 mm and a maximum focal length of 10 mm, the second camera device has a minimum focal length range of 6 mm and a maximum focal length of 9 mm, the first and second camera device have a minimum exposure time of 4700 μs and a maximum exposure time of 5000 μs.

11. The electronic device according to claim 1, wherein the white light source and the red light source are bar-shaped light sources, extension directions of the white light source and the red light source are in parallel with the plane of the product, the white light source and the red light source have a minimum brightness of 7100 lm and a maximum brightness of 8100 lm.

* * * * *